Nov. 4, 1969  F. BÜCHING  3,476,224
DRUM AND DISK BRAKE AND DUST COVER THEREFOR
Filed Feb. 1, 1968
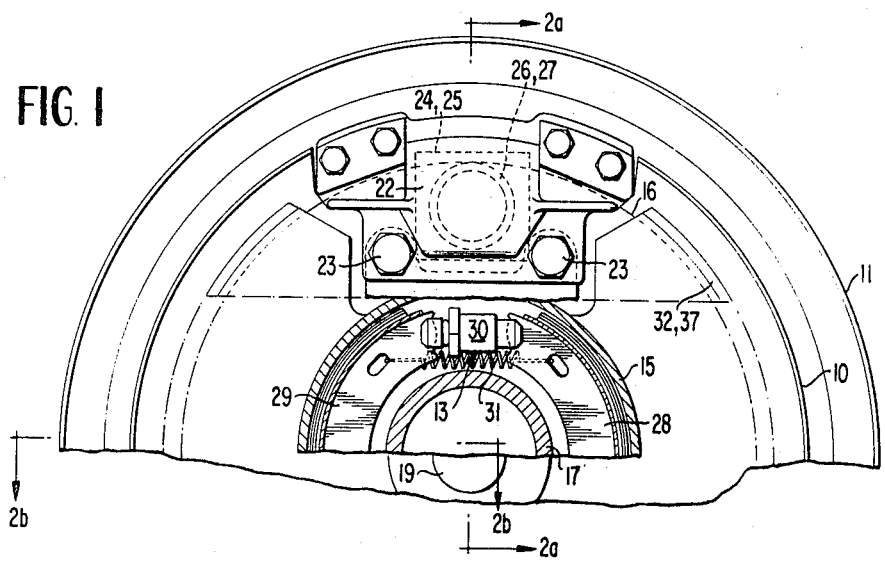
FIG. 1
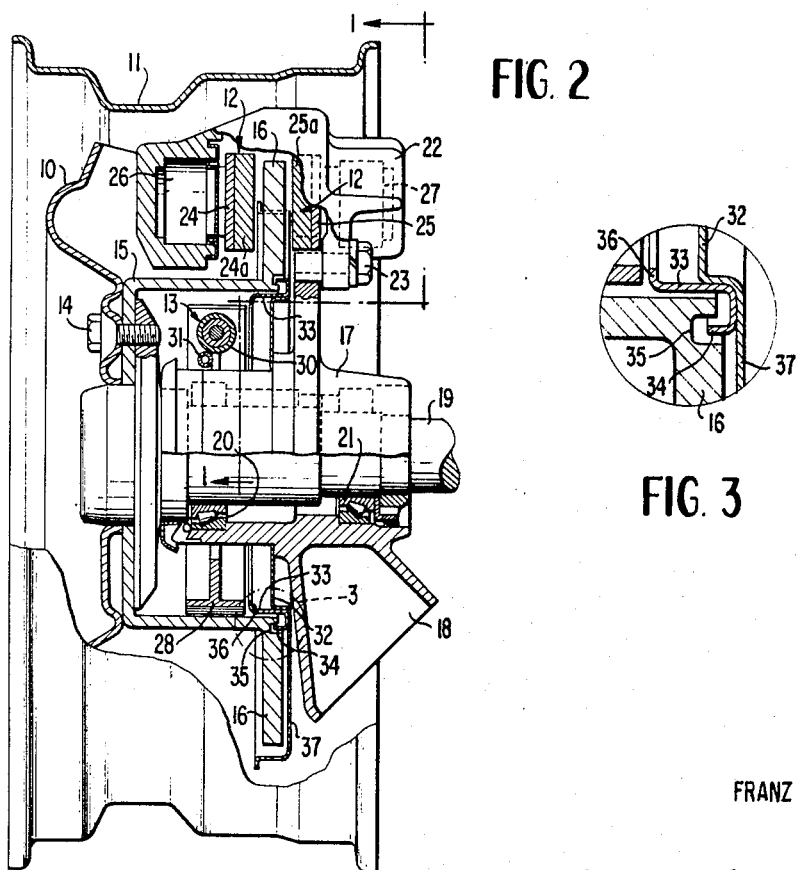
FIG. 2
FIG. 3
INVENTOR
FRANZ BUECHING
BY Craig & Antonelli
ATTORNEYS United States Patent Office 3,476,224
Patented Nov. 4, 1969

3,476,224
**DRUM AND DISK BRAKE AND DUST
COVER THEREFOR**
Franz Buching, Korb Kreis Waiblingen, Germany, assignor to Daimler-Benz Aktiengesellschaft, Stuttgart-Unterturkheim, Germany
Filed Feb. 1, 1968, Ser. No. 702,237
Claims priority, application Germany, Feb. 4, 1967,
D 52,199
Int. Cl. F16d 65/10, 55/10
U.S. Cl. 188—218                                4 Claims

ABSTRACT OF THE DISCLOSURE

A brake installation for vehicle wheels which is equipped with an outer brake, especially a disk brake and with an inner brake, especially a shoe brake, whereby a drum-shaped part, that may also form the hub of the brake disk, surrounds the innner brake in a housing-like manner and the inner brake is sealed against water seeking to penetrate into the same by a labyrinth seal arranged at the edge of the drum-shaped part. The labyrinth-like seal may be in the form of a cover plate having an axially bent portion engaging in an annular groove provided in the drum-shaped part.

Background of the invention

The present invention relates to a brake installation at vehicle wheels provided with an outer brake, especially a disk brake, and with an inner brake, especially a shoe brake, whereby a drum-shaped part of the outer brake, especially the hub of a disk brake, surrounds the inner brake in a housing-like manner. Such an inner brake is particularly endangered against the penetration of water which, may cause above all a strong corrosion in conjunction with the customary salts used on roads in the winter.

Summary of the invention

The present invention aims above all at an elimination of this disadvantage and essentially consists in that the inner brake is sealed against penetrating water by a labyrinth seal at the drum-shaped part.

Preferably a sheet metal cover plate is arranged for this purpose at the non-rotating wheel carrier between the latter and the rotating drum-shaped part which covers the interior of the drum-shaped part axially against the outside whereby the cover plate engages with an axially bent edge in an annular groove of the drum-shaped part. Possibly, the sheet metal cover plate covering the inner brake and forming the labyrinth seal may be extended radially outwardly by means of a further sheet metal plate connected therewith and may also cover off the outer brake in the axial direction.

Accordingly, it is an object of the present invention to provide a brake installation for vehicle wheels which is simple in construction, yet eliminates the aforementioned shortcomings and drawbacks encountered in the prior art.

Another object of the present invention resides in a brake installation for vehicle wheels which assures long length of useful life by protecting the same against corrosion caused by penetration of moisture and water from the road.

Still a further object of the present invention resides in a brake installation of the type described above in which the brake installation is effectively sealed against water seeking to enter the inside of the brake structure.

These and further objects, features and advantages of the present invention will become more obvious from the following description when taken in connection with the accompanying drawing which shows, for purposes of illustration only, one embodiment in accordance with the present invention, and wherein:

FIGURE 1 is a partial cross-sectional view through a brake installation of the present invention, taken along line 1—1 of FIGURE 2;

FIGURE 2 is a cross-sectional view through the brake installation of FIGURE 1, taken in the upper part thereof along line 2a—2a and in the lower part thereof along line 2b—2b of FIGURE 1; and FIGURE 3 is a partial cross-sectional view, on a greatly enlarged scale and illustrating the details within the circle 3 of FIGURE 2.

Referring now to the drawing wherein like reference numerals are used throughout the various views to designate like parts, a radially outer disk brake generally designated by reference numeral 12 and an inner shoe brake generally designated by reference numeral 13 are accommodated inside of the wheel disk 10 with the wheel rim 11. The disk brake 12 is thereby arranged radially outwardly of the drum-shaped part 15 which itself is rigidly connected with the wheel disk 10 by means of bolts 14; the drum-shaped part 15 at the same time constitutes, on the one hand, the hub of the rotating brake disk 16 and, on the other, the brake drum for the shoe brake 13. The latter is thereby located radially inwardly of the drum-shaped part 15 between the latter and the non-rotating wheel carrier 17 which is flangedly connected in any suitable manner, for example, at 18, at a swinging half-axle, at an inclined guide member or at any other axle member of conventional construction.

The wheel drive shaft 19 is rigidly connected with the wheel disk 10 and/or with the hub or brake drum 15 whereby the wheel drive shaft 19 is rotatably supported by means of conventional roller bearings 20 and 21 or in any other suitable manner within the wheel carrier 17.

The brake carrier 22, for example, in the shape of a brake jaw, is rigidly connected, for example, by means of bolts 23 with the wheel carrier 17. The brake carrier 22 carries the movable brake disks 24 and 25 provided with the brake linings 24a and 24b, respectively, which can be pressed against the centrally disposed rotating brake disk 16 by means of hydraulic cylinders 26 and 27.

The inner shoe brake 13 which is constructed, for instance, as conventional servo-brake, is provided, for example, with two shoes 28 and 29 which are expanded against the effect of a spring 31 by a hydraulic cylinder 30 in a conventional manner and are thereby pressed against the part 15 serving as brake drum.

According to the present invention, in order to protect the shoe brake 13 against the penetration of water, the shoe brake 13 is covered axially outwardly thereof by a sheet metal cover plate 32. A sheet metal ring 33 connected with the cover plate 32 engages, on the one hand, by means of an externally bent edge 34 in the manner of a labyrinth seal into an annular groove 35 at the brake disk 16 or at the hub thereof 15 and is provided, on the other, with an inner bent edge 36 which forms an abutment shoulder for the lateral guidance of the brake shoes 28 and 29. The cover plate 32 may be extended radially outwardly beyond the disk 16 over the largest part of the circumference on both sides of the brake carrier 22 as indicated schematically at 37.

While I have shown and described one embodiment in accordance with the present invention, it is understood that the same is not limited thereto, but is susceptible of numerous changes and modifications as known to a person skilled in the art.

I claim:
1. A brake installation for a vehicle wheel, comprising:
cylindrical brake drum means arranged for rotation with said wheel, brake shoe means disposed within said brake drum means and adapted for selective braking engagement therewith,
brake disk means constructed in the form of an outward radial extension of one lateral edge of said brake drum means, said brake drum means including an annular groove in the region of said one lateral edge thereof, brake carrier means including movable friction pad means adapted for selective braking engagement with said brake disk means, and
cover plate means including sealing flange means for sealing engagement within said annular groove of said brake drum means, whereby the interior of said brake drum means is effectively sealed off from the outside, in the axial direction of said one lateral edge of said brake drum means, wherein said cover plate means extends radially outwardly to an extent beyond the outermost edge of said brake disk means, said cover plate means incorporating a recess to accommodate said brake carrier means therewithin, thus facilitating selective engagement of said friction pad means with said brake disk means within said cover plate means.
2. A brake installation according to claim 1, wherein said radial extension of said cover plate means includes a sheet metal portion secured to a major portion of said cover plate means incorporating said sealing flange means.
3. A brake installation according to claim 2, wherein said sealing flange means extends axially within said cylindrical brake drum means whereby the innermost surface of said sealing flange means serves as an abutment for at least one brake shoe means.
4. A brake installation according to claim 1, further comprising wheel cover means disposed so as to effectively seal off the interior of said brake drum means, in the axial direction opposite said one lateral edge of said brake drum means.

References Cited

UNITED STATES PATENTS

| 2,952,339 | 9/1960 | Felts. | |
| 3,122,221 | 2/1964 | Von Rucker | 188—70 X |
| 3,310,135 | 3/1967 | Wells | 188—73 |

FOREIGN PATENTS

| 495,002 | 11/1938 | Great Britain. |
| 1,090,058 | 11/1967 | Great Britain. |

GEORGE E. A. HALVOSA, Primary Examiner